US010747691B2

(12) United States Patent
Schmisseur et al.

(10) Patent No.: US 10,747,691 B2
(45) Date of Patent: Aug. 18, 2020

(54) MEMORY DEVICE, A DUAL INLINE MEMORY MODULE, A STORAGE DEVICE, AN APPARATUS FOR STORING, A METHOD FOR STORING, A COMPUTER PROGRAM, A MACHINE READABLE STORAGE, AND A MACHINE READABLE MEDIUM

(71) Applicant: Intel Corporation, Santa Clara, CA (US)

(72) Inventors: Mark Schmisseur, Phoenix, AZ (US); Thomas Willhalm, Sandhausen (DE); Francesc Guim Bernat, Barcelona (ES); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/949,095

(22) Filed: Apr. 10, 2018

(65) Prior Publication Data
US 2019/0042490 A1 Feb. 7, 2019

(51) Int. Cl.
*G06F 13/16* (2006.01)
*G06F 9/38* (2018.01)
*G06F 9/30* (2018.01)
*G06N 20/00* (2019.01)

(52) U.S. Cl.
CPC ........ *G06F 13/1668* (2013.01); *G06F 9/3004* (2013.01); *G06F 9/3836* (2013.01); *G06N 20/00* (2019.01)

(58) Field of Classification Search
None
See application file for complete search history.

(56) References Cited

U.S. PATENT DOCUMENTS

| 6,324,629 B1* | 11/2001 | Kulkarni | G06F 12/0864 711/118 |
| 8,922,553 B1* | 12/2014 | Tena | G06T 17/00 345/419 |
| 2015/0026450 A1* | 1/2015 | Adiki | G06F 8/654 713/100 |

OTHER PUBLICATIONS

Panda, R., etal., Data Memory Organization and Optimizations in Application-Specific Systems. IEEE., pp. 56-68. (Year: 2001).*

(Continued)

*Primary Examiner* — Eric Coleman
(74) *Attorney, Agent, or Firm* — 2SPL Patent Attorneys PartG mbB; Kieran O'Leary (57) ABSTRACT

Examples provide a memory device, a dual inline memory module, a storage device, an apparatus for storing, a method for storing, a computer program, a machine readable storage, and a machine readable medium. A memory device is configured to store data and comprises one or more interfaces configured to receive and to provide data. The memory device further comprises a memory module configured to store the data, and a memory logic component configured to control the one or more interfaces and the memory module. The memory logic component is further configured to receive information on a specific memory region with one or more model identifications, to receive information on an instruction to perform an acceleration function for one or more certain model identifications, and to perform the acceleration function on data in a specific memory region with the one or more certain model identifications.

19 Claims, 5 Drawing Sheets

(56) References Cited

OTHER PUBLICATIONS

Cabambi, S. etal., A Massively Parallel FPGA-based Coprocessor for Support Vector Machines. IEEE. pp. 115-122. (Year: 2009).*

* cited by examiner

MEMORY DEVICE, A DUAL INLINE MEMORY MODULE, A STORAGE DEVICE, AN APPARATUS FOR STORING, A METHOD FOR STORING, A COMPUTER PROGRAM, A MACHINE READABLE STORAGE, AND A MACHINE READABLE MEDIUM

FIELD

Examples relate to a concept for data processing and in particular to a memory device, a dual inline memory module, a storage device, an apparatus for storing, a method for storing, a computer program, a machine readable storage, and a machine readable medium.

BACKGROUND

Data processing applications often subdivide an overall processing task in multiple processing steps. An example for such subdivision is data pre-processing or data conditioning.

For example, some processing applications may require training models to fetch data that will be used to train a given model, apply a set of transformations (which typically are common across different model types), and store the data back into the physical media and start training.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples may extend memory and storage devices deployed in an Artificial Intelligence (AI) data center appliance by certain acceleration functions and thereby reduce effort in fetching data, apply a set of transformations and store the processed data back to the physical storage. Examples may enable to offload processing steps in the memory or storage device (or subsystem) with "compute in memory/storage" or "acceleration in memory/storage" functionality with the ability to perform this processing on a per-AI model/data set basis. Examples may avoid individual function calls for each image or data unit that is offloaded and enable processing on a per data model basis. Examples may provide an accelerated memory DIMM (Dual Inline Memory Module), a storage device, or a solid state drive, for example, for AI appliances.

Figure 1:
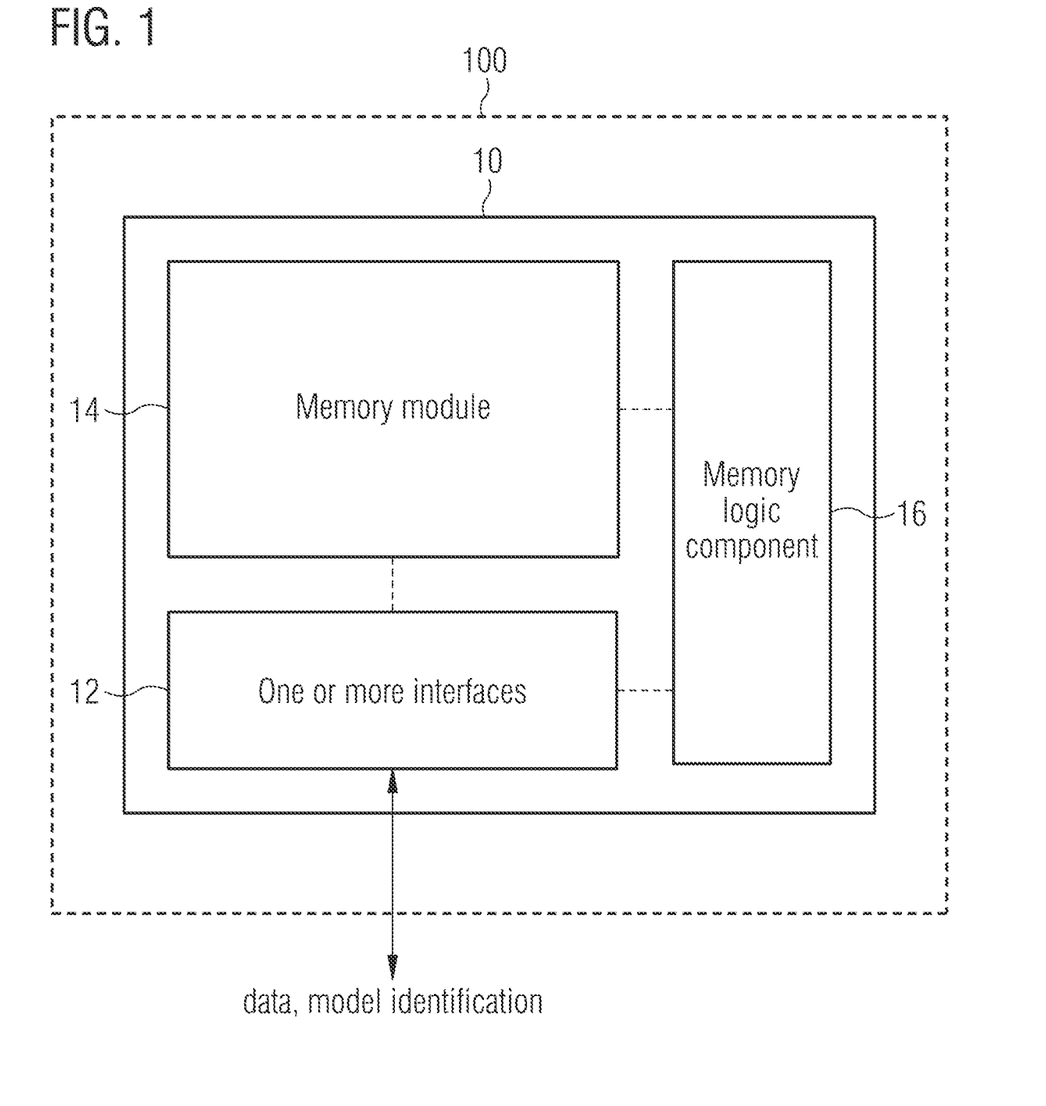
FIG. 1 shows examples of a memory device, an apparatus for storing data, a dual inline memory module, and a storage device.

FIG. 1 shows examples of a memory device or an apparatus 10 for storing data, a dual inline memory module or a storage device/solid state drive 100, respectively. As shown in FIG. 1, a memory device 10 is configured to store data and comprises one or more interfaces 12, which are configured to receive and to provide data. The memory device 10 further comprises a memory module 14, which is configured to store the data. The memory device 10 further comprises a memory logic component 16 configured to control the one or more interfaces 12 and the memory module 14. FIG. 1 indicates optional coupling between the one or more interfaces 12 and the memory module 14 using broken lines. The memory logic component 16 is configured to receive information on a specific memory region with one or more model identifications. The memory logic component 16 is further configured to receive information on an instruction to perform an acceleration function for one or more certain model identifications. The memory logic component 16 is further configured to perform the acceleration function on data in a specific memory region with the one or more certain model identifications.

FIG. 1 shows an example of an apparatus 10 for storing data. The apparatus 10 comprises means 12 for receiving and for providing data, e.g. in terms of one or more interfaces 12. In examples the one or more interfaces 12 may correspond to any means for obtaining, receiving, transmitting or providing analog or digital signals or information, e.g. any connector, contact, pin, register, input port, output port, conductor, lane, which allows providing a signal or information. An interface 12 may be wireless or wireline and it may be configured to communicate, i.e. transmit or receive signals or information with further internal or external components.

The apparatus 10 further comprises means 14 for storing the data, e.g. in terms of a memory module 14. The means 14 for storing may correspond to any memory or storage. Examples are read only memory (ROM) for storing data, programmable ROM (PROM), erasable PROM (EPROM), electrically EPROM (EEPROM), random access memory (RAM), dynamic RAM (DRAM), static RAM (SRAM), non-volatile storage, any semiconductor memory, and it may be arranged in any architecture using any technology, e.g. phase change memory (PCM), dynamic random access memory (DRAM), flash memory, stackable cross point memory (SXP), three dimensional cross point (3D XPoint), DDR (double data rate memory).

The apparatus 10 further comprises means 16 for receiving information on a specific memory region with one or more model identifications, for receiving information on an instruction to perform an acceleration function for one or more certain model identifications, and means 16 for performing the acceleration function on data in a specific memory region with the one or more certain model identifications, e.g. in terms of the memory logic component 16. In examples the means 16 or the memory logic component 16 may be implemented using one or more processing units, one or more processing or controlling devices, any means for processing/controlling, any means for determining, any means for calculating, such as a processor, a computer, a controller or a programmable hardware component being operable with accordingly adapted software. In other words, the described function of the means 16 or the memory logic component 16 may as well be implemented in software, which is then executed on one or more programmable hardware components. Such hardware components may comprise a general purpose processor, a controller, a Digital Signal Processor (DSP), a micro-controller, any processor, or any hardware capable of executing software instructions. In examples accelerated hardware, e.g. an FPGA (Field Programmable Gate Array), may be used to implement the means 16 or the memory logic component 16.

Further examples are a storage device 100 in general, a dual inline memory module 10, or a solid state drive 100 comprising an example of the device or apparatus 10, as shown in FIG. 1 using broken lines.

Figure 2:
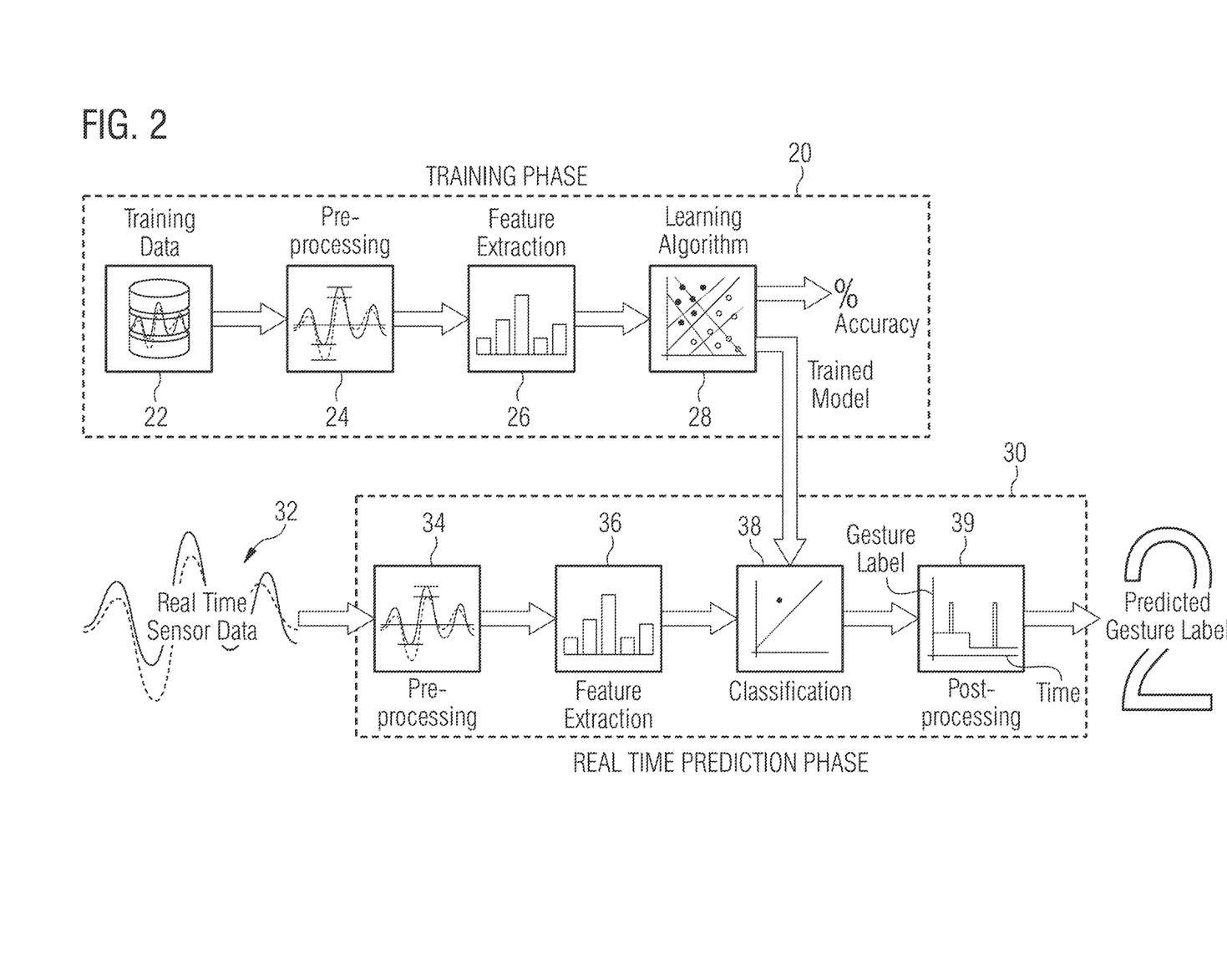
FIG. 2 shows an example data processing chain.

FIG. 2 shows an example data processing chain in an example. In the example shown in FIG. 2 an AI-scenario is assumed using a training phase 20 and a real time prediction phase 30. Training data is stored at a storage component 22 and the training data is used for pre-processing 24 in order to extract features 26 from the training data. Based on the feature extraction 26 a learning algorithm 28 can develop a trained model with a certain accuracy. The trained model can then be used in the real time prediction phase 30. In the real time prediction phase 30 real time sensor data 32 is pre-processed 34 and features are extracted 36. A classification 38 can then determine post-processing 39 input data based on the extracted features and the trained model formed by the training phase 20. For example, such a processing chain can be used to predict certain gesture labels, for speech recognition or for face recognition applications.

As shown in FIG. 2 many AI solutions pre-process different data sets that have been previously stored in physical media (memory or storage) before starting to train a new AI model. For example, memory or storage may contain a set of images or conversations that maybe associated potentially to one or more models, for example, different speech recognition models. In examples a data set may correspond to speech frame, e.g. of length of 10 ms, 20 ms, 50 ms, 100 ms, 200 ms, 1 s, or 2 s. In other examples a data set may correspond to image or video data, e.g. a single image of 4 kB, 10 kB, 50 kB, 100 kB, 200 kB, 1 MB, 2 MB, 4 MB. For example, a data set may comprise image data of high or low resolution or a video frame of multiple images.

In examples the information on the specific memory region may comprise one or more elements of the group of information on a size of a data-set entry, information on a field inside a data set, information on data units in a data-set, information on memory cells comprising a data unit, and information on characteristics of a data set. Examples may allow organizing data in a memory based on model identification. For example, information may be made available which memory cells together comprise a data "unit" inside the memory module 14 configured to store the data. A data unit may, for example, be an array or an image or a video. In some examples the memory logic 16 is given a comprehension of how to discern different data units within the memory module 14, e.g. as a prerequisite to operate on the data. The discernment may be provided by the application, for example, every 2 kB is an image.

FIG. 2 depicts an AI model execution flow with pre-processing steps. In this example, pre-processing 24 and feature extraction 26 need to be applied before the actual learning algorithm. It is one finding of examples that it may be inefficient to bring data sets to the processor cores, to pre-process them, and then have to store them back in memory or storage before the training step. Inherent "infinite data parallelism" may be lost and bottlenecks such as memory bandwidth or storage bandwidth may be introduced. Being able to apply specialized AI transformations "on a per model-basis" in the memory and storage subsystem allows for higher efficiency in examples. For example, DIMMs and solid state drives may be enhanced using examples.

Examples may provide memory acceleration and memory computation by extending memory acceleration schemes to offer interfaces to a software stack to mark specific memory regions of the device with one or more model IDs (identifications) or model types to be used for data generators, to expose acceleration functions that can be used afterwards to perform operations, transformations on data per model ID basis (and copying to new locations if required). For example, the memory logic component 16 may be configured to mark particular regions with one or more model identifications or model types based on the information on the specific memory region.

In examples the acceleration function may comprise operations on data on a per data model basis, which is specified by the one or more model identifications. Such acceleration function may include data processing or pre-processing steps, e.g. background noise removal on audio or video data, or image processing or pre-processing steps on image data. E.g. in a face recognition application such acceleration function may be used to extract relevant data of a face of a person from an image of a scene with that person. For example, such an acceleration function may include background data removal steps. Such acceleration function may be partly implemented in hardware according to the above description.

Examples may provide a mechanism to efficiently transform and process training data. Providers, such as IoT (internet of things) devices, video surveillance cameras or cars, may store data in a data center without intervention of software stack and the corresponding compute elements. Examples may hence provide relevant methods to accelerate data preprocessing for AI appliances. For example, the acceleration function comprises transformations on data on a per data model basis, which is specified by the one or more model identifications.

Figure 3:
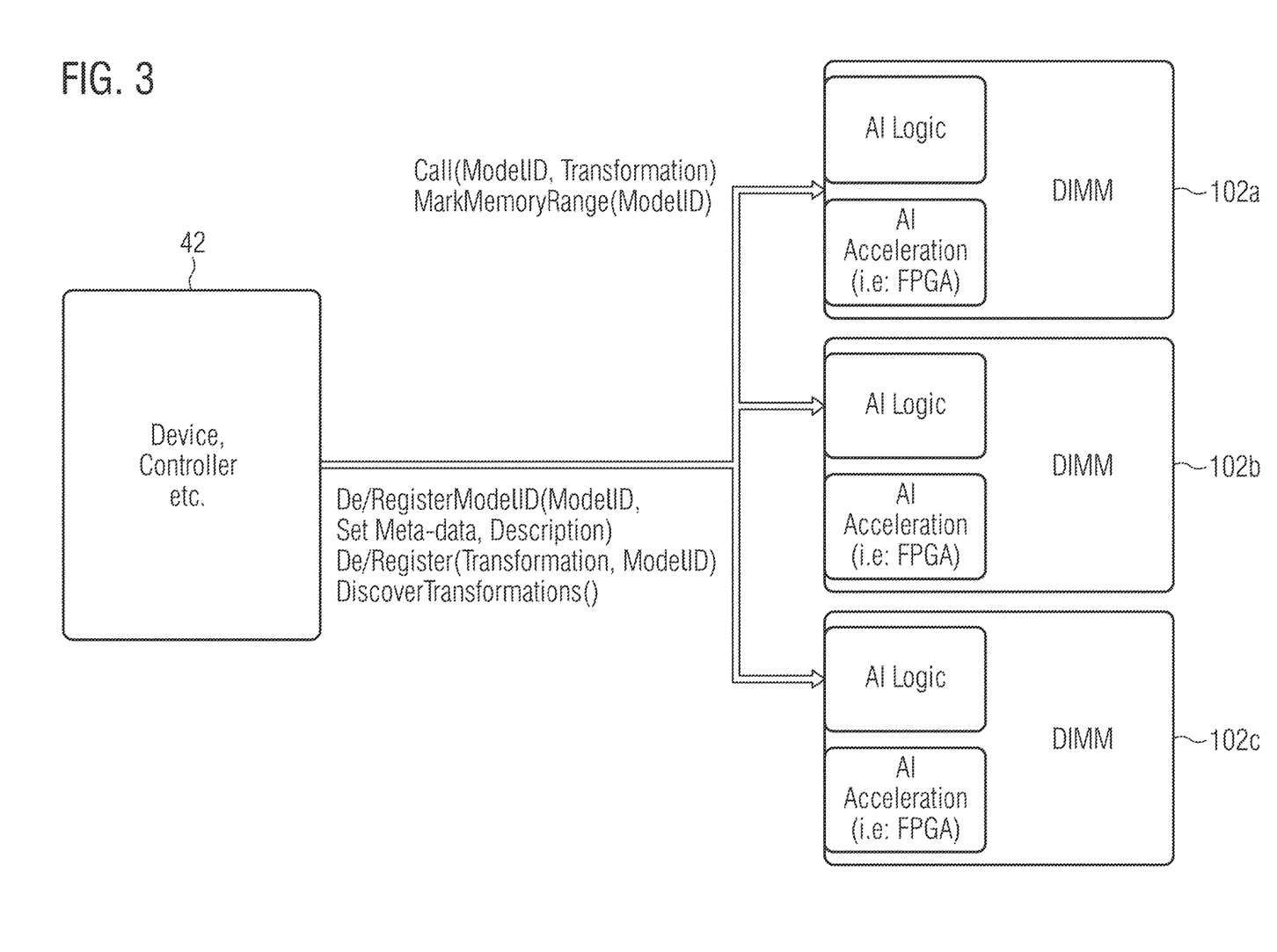
FIG. 3 shows an example architecture.

FIG. 3 shows an example architecture. FIG. 3 shows a device controller 42 on the left hand side, which is coupled to multiple DIMM modules 102a, 102b, 102c, which are shown on the right hand side. The DIMM modules 102a, 102b, 102c comprise examples of the above-described memory device 10. The memory logic component is also referred to as AI-logic being configured to provide an AI acceleration function, e.g. implemented as an FPGA or any AI acceleration hardware logic. For example, the device controller 42 may call an AI acceleration function at a DIMM module 102a, 102b, 102c using a model ID, to perform transformation and mark a certain memory range with said memory ID. Functions may include registering or deregistering a model ID, which could be described using a set of meta-data and/or description, registering or deregistering transformations based on a model ID, and discovery functions for transformations.

Figure 4:
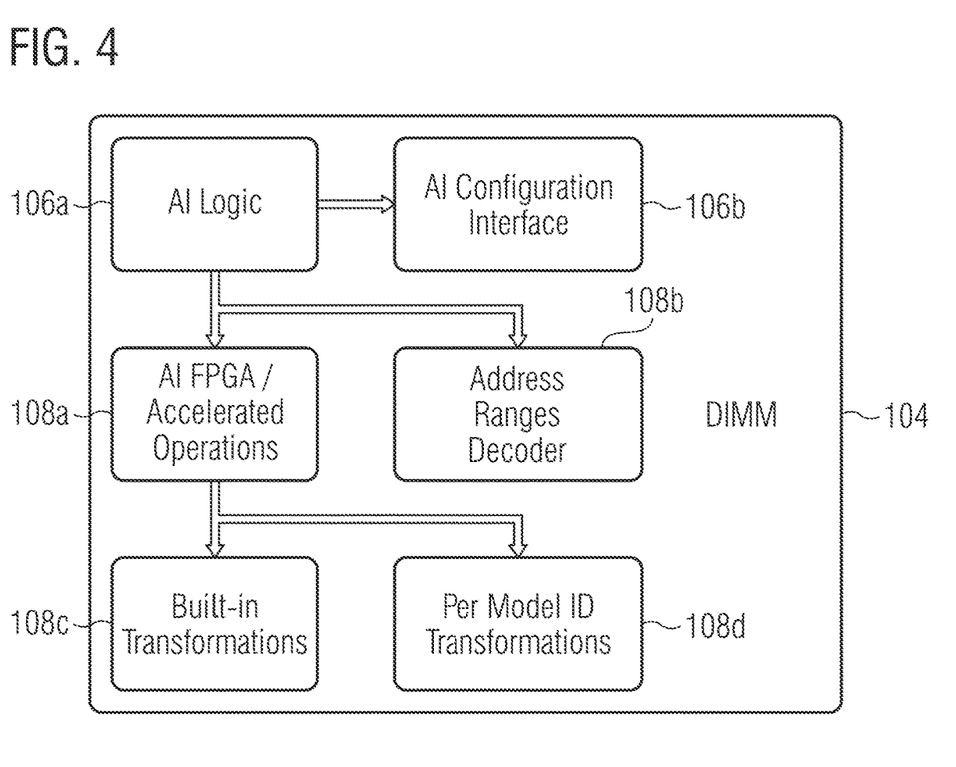
FIG. 4 shows another example architecture.

FIG. 4 shows another example architecture of a DIMM module 104 comprising an example of the above memory device 10 with more details on the memory logic 16. The DIMM module 104 comprises an AI logic 106a, which is coupled to an AI configuration interface 106b. The AI logic 106a can use an AI FPGA 108a for accelerated operations and the AI logic 106a can use an address range decoder 108b. The memory logic component 16, 106a may comprise a system address decoder 108b configured to decode system addresses in terms of memory regions relating to one or more model identifications.

Furthermore, the memory logic has built-in transformations 108c and per model ID transformations 108d. In examples the memory logic component 16, 106a may be configured to perform transformations from a predefined set of transformations for predefined artificial intelligence model types.

FIGS. 3 and 4 illustrate at high level view how some examples provide memory accelerations specialized for AI architectures. As shown, examples may extend the DIMM architecture (e.g. NVM DIMM (non-volatile memory DIMM), DDR (double data rate memory) and storage physical devices), for example, by multiple elements. An AI configuration interface 106b allows computing elements to configure the different functionalities that the logic 106a provides. For example, the interface 106b allows registering new type of model IDs and model types. The interface 106b may allow providing descriptions in form of meta-data that defines a data-set. This may include things like: size of data-set entry, fields inside the data set and their characteristics. This meta-data can be used afterwards for accelerated operations. In other words, the information on the specific memory region may comprise one or more elements of the group of information on a size of a data-set entry, information on a field inside a data set, information on data units in a data-set, information on memory cells comprising a data unit, and information on characteristics of a data set.

The interface 106b may allow marking particular memory regions with one or more model IDs or model types. This information may be used by a system address decoder 108b to discover what data is currently stored in the memory for a particular model ID or model type and how much of this data is actually valid. The interface 106b may further allow calling accelerated operations 108a for specific model types or model IDs (it can be specified per memory range). The calls may comprise one or more operations or transformations to be called, a model ID or model type and potential memory ranges, information on a destination where to copy the transformation, potentially a destination can be returned by the transformation.

In the example shown in FIG. 4, the one or more interfaces 12 are configured to provide access data on a model identification basis. The one or more interfaces 12 are configured to register data corresponding to a particular model identification in terms of one or more elements of the group of data size, memory range and one or more memory addresses.

As shown in FIG. 4 the DIMM module 104 also comprises a system address decoder 108b. As has been already mentioned it may be responsible to decode what are the memory regions that are hosting specific model IDs or model types as described above. The system address decoder 108b is called by the AI logic 106a before calling an accelerated function 108a. As further depicted in FIG. 4 the DIMM module 104 comprises built-in transformations 108c, which provide a set of predefined transformations that may be provided by an OEM (original equipment manufacturer) for predefined AI model types that can be used by customers.

The "per model ID transformations" block 108d shown in FIG. 4 may be used to store acceleration functions registered by the software stack and associated to specific model IDs or model types. The DIMM module 104 of FIG. 4 further comprises the AI FPGA accelerated operations 108a being responsible for processing the requests that are generated by a software stack to using the AI configuration interface 106b. Such request may require to run a set of transformations in a pipeline mode, to run the transformations and modify the same data set, to run the transformations and copy the resulting data on a new memory range. In examples the information on the instruction may comprise an instruction to run a set of transformations in a pipeline mode. The information on the instruction may comprise an instruction to run a set of transformations and modifications for the same data set. The information on the instruction may comprise an instruction to run a set of transformations and copy the resulting data to a new memory range.

A further example is the following. A memory 10 hosts a set of 32 GB of conversations in one NVM DIMM. For example, the conversations could be Latin, American and/or Japanese. The conversations are for model type "SpeechRecognitionType", i.e. a predefined AI speech recognition model. A training model "SpeechRecognitionSpanish" needs to run a DNN (deep neural network) model on those elements in the 32 GBs that are Spanish, which can be done in the memory 10. The training model may call to:
Call(SelectLanguageTypeTransformation,
  Param=Spanish, data_type=SpeechRecognitionType,
  Destination=@Y).

The previous example is a filter example, however other transformations can apply (i.e. normalize a file of data-set entry values to their average).

In further examples certain parameters like Quality of Service (QoS) or model priorities can be considered by the memory logic component 16. Accordingly, memory logic component 16 can be configured to schedule multiple requests based on the QoS or model priority.

Figure 5:
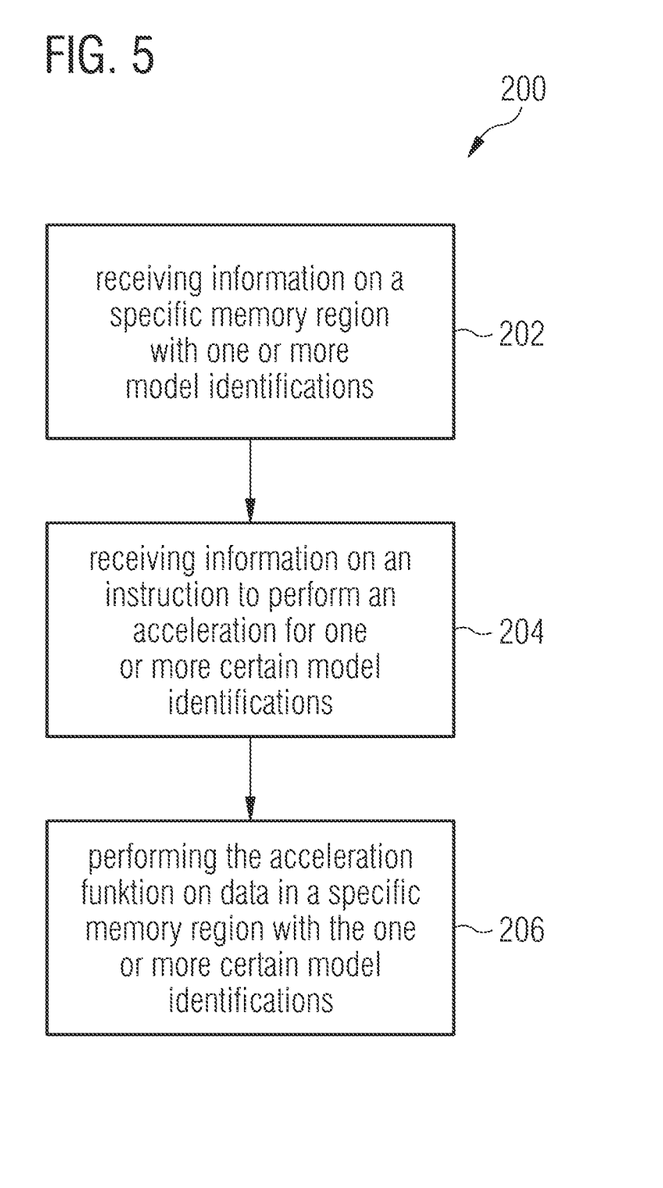
FIG. 5 shows a block diagram of an example of a method for storing data.

FIG. 5 shows a block diagram of an example of a method 200 for storing data. The method 200 for a memory device storing data, comprises receiving 202 information on a specific memory region with one or more model identifications, and receiving 204 information on an instruction to perform an acceleration function for one or more certain model identifications.

The method 200 further comprises performing 206 the acceleration function on data in a specific memory region with the one or more certain model identifications.

The examples as described herein may be summarized as follows:

Example 1 is a memory device 10 configured to store data comprising one or more interfaces 12 configured to receive and to provide data; a memory module 14 configured to store the data; and a memory logic component 16 configured to control the one or more interfaces 12 and the memory module 14. The memory logic component 16 is further configured to receive information on a specific memory region with one or more model identifications, receive information on an instruction to perform an acceleration function for one or more certain model identifications, and perform the acceleration function on data in a specific memory region with the one or more certain model identifications.

Example 2 is the memory device 10 of example 1, wherein the acceleration function comprises operations on data on a per data model basis, which is specified by the one or more model identifications.

Example 3 is the memory device 10 of example 1, wherein the acceleration function comprises transformations on data on a per data model basis, which is specified by the one or more model identifications.

Example 4 is the memory device 10 of example 1, wherein the information on the specific memory region comprises one or more elements of the group of information on a size of a data-set entry, information on a field inside a data set, information on data units in a data-set, information on memory cells comprising a data unit, and information on characteristics of a data set.

Example 5 is the memory device 10 of example 1, wherein the memory logic component 16 is configured to mark particular regions with one or more model identifications or model types based on the information on the specific memory region.

Example 6 is the memory device 10 of example 1, wherein the memory logic component 16 comprises a system address decoder 108b configured to decode system addresses in terms of memory regions relating to one or more model identifications.

Example 7 is the memory device 10 of example 1, wherein the memory logic component 16 is configured to perform transformations from a predefined set of transformations for predefined artificial intelligence model types.

Example 8 is the memory device 10 of example 1, wherein the information on the instruction comprises an instruction to run a set of transformations in a pipeline mode.

Example 9 is the memory device 10 of example 1, wherein the information on the instruction comprises an instruction to run a set of transformations and modifications for the same data set.

Example 10 is the memory device 10 of example 1, wherein the information on the instruction comprises an instruction to run a set of transformations and copy the resulting data to a new memory range.

Example 11 is an apparatus 10 for storing data comprising means 12 for receiving and for providing data; means 14 for storing the data; means 16 for receiving information on a specific memory region with one or more model identifications, for receiving information on an instruction to perform an acceleration function for one or more certain model identifications; and means 16 for performing the acceleration function on data in a specific memory region with the one or more certain model identifications.

Example 12 is the apparatus 10 of example 11, wherein the acceleration function comprises operations on data on a per data model basis, which is specified by the one or more model identifications.

Example 13 is the apparatus 10 of example 11, wherein the acceleration function comprises transformations on data on a per data model basis, which is specified by the one or more model identifications.

Example 14 is the apparatus 10 of example 11, wherein the information on the specific memory region comprises one or more elements of the group of information on a size of a data-set entry, information on field inside a data set, information on data units in a data-set, information on memory cells comprising a data unit, and information on characteristics of a data set.

Example 15 is the apparatus 10 of example 11, wherein the means 16 for performing is configured to mark particular regions with one or more model identifications or model types based on the information on the specific memory region.

Example 16 is the apparatus 10 of example 11, wherein the means for performing 16 comprises means for decoding system addresses in terms of memory regions relating to one or more model identifications.

Example 17 is the apparatus 10 of example 11, wherein the means for performing 16 is configured to perform transformations from a predefined set of transformations for predefined artificial intelligence model types.

Example 18 is the apparatus 10 of example 11, wherein the information on the instruction comprises an instruction to run a set of transformations in a pipeline mode.

Example 19 is the apparatus 10 of example 11, wherein the information on the instruction comprises an instruction to run a set of transformations and modifications for the same data set.

Example 20 is the apparatus 10 of example 11, wherein the information on the instruction comprises an instruction to run a set of transformations and copy the resulting data to a new memory range.

Example 21 is a dual inline memory module 100 comprising the device 10 of example 1 or the apparatus 10 of example 11.

Example 22 is the dual inline memory module 100 of example 21, wherein the one or more interfaces 12 are configured to provide access to data on a model identification basis, or wherein the means 12 for receiving and for providing data are configured to provide access to data on a model identification basis.

Example 23 is the dual inline memory module 100 of example 21, wherein the one or more interfaces 12 are configured to register data corresponding to a particular model identification in terms of one or more elements of the group of data size, memory range and one or more memory addresses, or wherein the means 12 for receiving and for providing data are configured to register data corresponding to a particular model identification in terms of one or more elements of the group of data size, memory range and one or more memory addresses.

Example 24 is a storage device 100 comprising the device 10 of example 1 or the apparatus 10 of example 11.

Example 25 is the storage device 100 of example 24, wherein the one or more interfaces 12 are configured to provide access to data on a model identification basis, or wherein the means 12 for receiving and for providing data are configured to provide access to data on a model identification basis.

Example 26 is the storage device 100 of example 24, wherein the one or more interfaces 12 are configured to register data corresponding to a particular model identification in terms of one or more elements of the group of data size, memory range and one or more memory addresses, or wherein the means for receiving 12 and for providing data are configured to register data corresponding to a particular model identification in terms of one or more elements of the group of data size, memory range and one or more memory addresses.

Example 27 is a solid state drive 100 comprising the device 10 of example 1 or the apparatus 10 of example 11.

Example 28 is the solid state drive 100 of example 27, wherein the one or more interfaces 12 are configured to provide access to data on a model identification basis, or wherein the means 12 for receiving and for providing data are configured to provide access to data on a model identification basis.

Example 29 is the solid state drive of example 27, wherein the one or more interfaces 12 are configured to register data corresponding to a particular model identification in terms of one or more elements of the group of data size, memory range and one or more memory addresses, or wherein the means 12 for receiving and for providing data are configured to register data corresponding to a particular model identification in terms of one or more elements of the group of data size, memory range and one or more memory addresses.

Example 30 is a method 200 for a memory device 10 storing data, comprising receiving 202 information on a specific memory region with one or more model identifications; receiving 204 information on an instruction to perform an acceleration function for one or more certain model identifications; and performing 206 the acceleration function on data in a specific memory region with the one or more certain model identifications.

Example 31 is the method 200 of example 30, wherein the acceleration function comprises operations on data on a per data model basis, which is specified by the one or more model identifications.

Example 32 is the method 200 of example 30, wherein the acceleration function comprises transformations on data on a per data model basis, which is specified by the one or more model identifications.

Example 33 is the method 200 of example 30, wherein the information on the specific memory region comprises one or more elements of the group of information on a size of a data-set entry, information on field inside a data set, information on data units in a data-set, information on memory cells comprising a data unit, and information on characteristics of a data set.

Example 34 is the method of example 30, wherein the performing 206 is configured to mark particular regions with one or more model identifications or model types based on the information on the specific memory region.

Example 35 is the method 200 of example 30, wherein the performing 206 comprises decoding system addresses in terms of memory regions relating to one or more model identifications.

Example 36 is the method 200 of example 30, wherein the performing 206 is configured to perform transformations from a predefined set of transformations for predefined artificial intelligence model types.

Example 37 is the method 200 of example 30, wherein the information on the instruction comprises an instruction to run a set of transformations in a pipeline mode.

Example 38 is the method 200 of example 30, wherein the information on the instruction comprises an instruction to run a set of transformations and modifications for the same data set.

Example 39 is the method 200 of example 30, wherein the information on the instruction comprises an instruction to run a set of transformations and copy the resulting data to a new memory range.

Example 40 is a computer program having a program code for performing the method of example 30, when the computer program is executed on a computer, a processor, or a programmable hardware component.

Example 41 is a machine readable storage including machine readable instructions, when executed, to implement a method or realize an apparatus as exemplified in any pending example.

Example 42 is a machine readable medium including code, when executed, to cause a machine to perform the method of example 30.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller". as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A memory device configured to store data, comprising one or more interfaces configured to receive and to provide data;
a memory module configured to store the data; and
a memory logic component configured to control the one or more interfaces and the memory module, wherein the memory logic component is further configured to
  receive information on a specific memory region marked by one or more artificial intelligence model identifications,
  receive information on an instruction to perform an acceleration function for one or more certain artificial intelligence model identifications, and
  perform the acceleration function on data in a specific memory region with the one or more certain artificial intelligence model identifications.

2. The memory device of claim 1, wherein the acceleration function comprises operations on data on a per data model basis, which is specified by the one or more artificial intelligence model identifications.

3. The memory device of claim 1, wherein the acceleration function comprises transformations on data on a per data model basis, which is specified by the one or more artificial intelligence model identifications.

4. The memory device of claim 1, wherein the information on the specific memory region comprises one or more elements of the group of information on a size of a data set entry, information on a field inside a data set, information on data units in a data-set, information on memory cells comprising a data unit, and information on characteristics of a data set.

5. The memory device of claim 1, wherein the memory logic component is configured to mark particular regions with one or more artificial intelligence model identifications or model types based on the information on the specific memory region.

6. The memory device of claim 1, wherein the memory logic component comprises a system address decoder configured to decode system addresses in terms of memory regions relating to one or more artificial intelligence model identifications.

7. The memory device of claim 1, wherein the memory logic component is configured to perform transformations from a predefined set of transformations for predefined artificial intelligence model types.

8. The memory device of claim 1, wherein the information on the instruction comprises an instruction to run a set of transformations in a pipeline mode.

9. The memory device of claim 1, wherein the information on the instruction comprises an instruction to run a set of transformations and modifications for the same data set.

10. The memory device of claim 1, wherein the information on the instruction comprises an instruction to run a set of transformations and copy the resulting data to a new memory range.

11. A method for a memory device storing data, comprising
receiving information on a specific memory region marked by one or more artificial intelligence model identifications;
receiving information on an instruction to perform an acceleration function for one or more certain artificial intelligence model identifications; and
performing the acceleration function on data in a specific memory region with the one or more certain artificial intelligence model identifications.

12. The method of claim 11, wherein the acceleration function comprises operations on data on a per data model basis, which is specified by the one or more artificial intelligence model identifications.

13. The method of claim 11, wherein the acceleration function comprises transformations on data on a per data model basis, which is specified by the one or more artificial intelligence model identifications.

14. The method of claim 11, wherein the information on the specific memory region comprises one or more elements of the group of information on a size of a data-set entry, information on field inside a data set, information on data units in a data-set, information on memory cells comprising a data unit, and information on characteristics of a data set.

15. The method of claim 11, wherein the performing is configured to mark particular regions with one or more artificial intelligence model identifications or model types based on the information on the specific memory region.

16. The method of claim 11, wherein the performing comprises decoding system addresses in terms of memory regions relating to one or more artificial intelligence model identifications.

17. The method of claim 11, wherein the performing is configured to perform transformations from a predefined set of transformations for predefined artificial intelligence model types.

18. The method of claim 11, wherein the information on the instruction comprises an instruction to run a set of transformations in a pipeline mode.

19. A non-transitory machine readable medium including code, when executed, to cause a machine to perform a method for a memory device storing data, comprising
    receiving information on a specific memory region marked by one or more artificial intelligence model identifications;
    receiving information on an instruction to perform an acceleration function for one or more certain artificial intelligence model identifications; and
    performing the acceleration function on data in a specific memory region with the one or more certain artificial intelligence model identifications.

\* \* \* \* \*